US012569823B2

(12) United States Patent
Cheng et al.

(10) Patent No.: US 12,569,823 B2
(45) Date of Patent: Mar. 10, 2026

(54) POLYMERIZATION VESSEL AND METHOD FOR MANUFACTURING THE SAME

(71) Applicant: FORMOSA PLASTICS CORPORATION, Yunlin County (TW)

(72) Inventors: Ming-Hung Cheng, Yunlin County (TW); Fuh-Yih Shih, Yunlin County (TW); Shih-Ming Yeh, Yunlin County (TW); Wen-Yi Wang, Yunlin County (TW)

(73) Assignee: FORMOSA PLASTICS CORPORATION, Yunlin County (TW)

( * ) Notice: Subject to any disclaimer, the term of this patent is extended or adjusted under 35 U.S.C. 154(b) by 566 days.

(21) Appl. No.: 18/193,297

(22) Filed: Mar. 30, 2023

(65) Prior Publication Data

US 2024/0075449 A1 Mar. 7, 2024

(30) Foreign Application Priority Data

Sep. 1, 2022 (TW) .................................. 111133238

(51) Int. Cl.
 *B01J 19/24* (2006.01)
 *B01J 19/00* (2006.01)
 (Continued)

(52) U.S. Cl.
 CPC ......... *B01J 19/243* (2013.01); *B01J 19/0053* (2013.01); *C25D 3/12* (2013.01);
 (Continued)

(58) Field of Classification Search
 CPC .... B01J 19/00; B01J 19/0006; B01J 19/0013; B01J 19/0053; B01J 19/02; B01J 19/18; B01J 19/24; B01J 19/2415; B01J 19/243; B01J 2219/00; B01J 2219/00049; B01J 2219/00051; B01J 2219/00074; B01J 2219/00085; B01J 2219/00781;
 (Continued)

(56) References Cited

U.S. PATENT DOCUMENTS 4,985,208 A * 1/1991 Sugawara ............... B29B 7/826
 366/147
6,820,992 B2 11/2004 Yu et al.
 (Continued)

FOREIGN PATENT DOCUMENTS

CN 105504101 A 4/2016
CN 217189594 U 8/2022
 (Continued)

*Primary Examiner* — Natasha E Young
(74) *Attorney, Agent, or Firm* — MUNCY, GEISSLER, OLDS & LOWE, P.C.

(57) ABSTRACT

The application relates to a polymerization vessel and a method for manufacturing the same. An interior surface of the polymerization vessel has a specific structure, so that the polymerization vessel has better heat transfer efficiency. Closed cooling channels are constructed from the specific structure, and therefore cooling fluid flows in the closed cooling channels. Furthermore, there won't be any by-pass defects in the cooling channels of the polymerization vessel, thereby improving cooling efficiency of the cooling fluid.

20 Claims, 6 Drawing Sheets

(51) Int. Cl.
　　*C25D 3/12* 　　　　(2006.01)
　　*C25D 7/04* 　　　　(2006.01)

(52) U.S. Cl.
　　CPC ....... *C25D 7/04* (2013.01); *B01J 2219/00792*
　　　　(2013.01); *B01J 2219/00795* (2013.01); *B01J*
　　　　　　　　　　　*2219/00822* (2013.01)

(58) Field of Classification Search
　　CPC .... B01J 2219/00788; B01J 2219/00792; B01J
　　　　　　2219/00795; B01J 2219/00819; B01J
　　　　　　2219/00822; C25D 3/00; C25D 3/02;
　　　　　　C25D 3/12; C25D 7/00; C25D 7/04
　　See application file for complete search history.

(56) 　　　　　　References Cited

U.S. PATENT DOCUMENTS

| 10,738,137 | B2 * | 8/2020 | Kotake | .................. B01F 35/93 |
| 2003/0072146 | A1 | 4/2003 | Yu et al. | |
| 2021/0008519 | A1 | 1/2021 | Feller et al. | |

FOREIGN PATENT DOCUMENTS

| EP | 0465703 B1 * | 5/1994 | ........... B01F 27/902 |
| JP | 2010-53294 A | 3/2010 | |
| TW | 189789 B | 9/1992 | |
| TW | 514986 B | 12/2002 | |
| TW | 201533070 A | 9/2015 | |

* cited by examiner

POLYMERIZATION VESSEL AND METHOD FOR MANUFACTURING THE SAME

RELATED APPLICATIONS

This application claims priority to Taiwan Application Serial Number 111133238, filed on Sep. 1, 2022, which is incorporated herein by reference.

BACKGROUND

Field of Invention

The present application relates to a polymerization vessel. More particularly, the present application provides a polymerization vessel with a specific cooling flow channel and a method for manufacturing thereof, and the polymerization vessel has excellent heat removal efficacy.

Description of Related Art

With the development of material science, polymer materials with easy processing, light weight and excellent mechanical properties are widely used. Polyvinyl chloride is a commonly used polymer material because it has a simple production process and can be used to easily produce various types of products by general blending and molding.

In general, the preparation of polyvinyl chloride is carried out by the polymerization reaction in a polymerization vessel. The reaction heat generated by the polymerization reaction is removed by introducing a cooling fluid. As volumes of the polymerization vessel are larger, more reaction heat is generated, and therefore heat removal efficacy of the polymerization vessel is continuously improved. In the conventional polymerization vessel, an intercepting plate and a jacket plate used to separate flow channels are disposed outside the vessel body to form a jacket structure, such that the cooling fluid can be introduced to remove the reaction heat. However, a gap is easily presented between the intercepting plate and the jacket plate, thereby generating by-pass defects of the cooling fluid in the flow channel, and further the heat removal efficacy of the cooling channel is lowered.

Accordingly, there is an urgent need to provide a polymerization vessel and a method for manufacturing the same to improve the defects of the conventional polymerization vessel.

SUMMARY

Therefore, an aspect of the present application is to provide a polymerization vessel. The polymerization vessel includes a cooling channel with a specific structure, and thereby the by-pass defects of the conventional cooling channel can be prevented. Therefore, the heat removal efficacy can be efficiently enhanced.

Another aspect of the present application is to provide a method for manufacturing a polymerization vessel. A vessel body of the polymerization vessel is subjected to an excavation process to form the aforementioned cooling channel with the specific structure, thereby efficiently solving the by-pass defects, and further the heat removal efficacy of the polymerization vessel can be enhanced.

According to an aspect of the present application, a polymerization vessel is provided. The polymerization vessel comprises a vessel body, at least one shell plate, at least one fluid inlet and at least one fluid outlet. The vessel body includes a vessel wall and a plurality of partition walls. Each of the partition walls protrudes from an interior surface of the vessel wall, and the partition walls and the vessel wall are integrally formed. The at least one shell plate joints each adjacent two of the partition walls, and at least one flow channel is defined by each adjacent two of the partition walls, the vessel wall and the at least one shell plate. The at least one fluid inlet passes through the vessel wall, and the at least one fluid inlet communicates with the at least one flow channel in one-to-one manner. The at least one fluid outlet passes through the vessel wall, and the at least one fluid outlet communicates with the at least one flow channel in one-to-one manner.

According to some embodiments of the present application, the polymerization vessel further comprises a metallic covering layer. The metallic covering layer is disposed on a surface of the at least one flow channel, and the metallic covering layer is formed from a material with a lower fouling factor than materials of the vessel body and the at least one shell plate.

According to some embodiments of the present application, the aforementioned metallic covering layer includes a nickel layer.

According to some embodiments of the present application, a thickness of the nickel layer is not less than 0.01 mm.

According to some embodiments of the present application, the at least one shell plate covers each adjacent two of the partition walls, and each adjacent two of the at least one shell plate do not overlap in a direction perpendicular to an axis of the vessel body.

According to some embodiments of the present application, there is no a gap between each adjacent two of the at least one shell plate According to some embodiments of the present application, an inner surface of the at least one shell plate is coplanar to an inner surface of each of the partition walls.

According to some embodiments of the present application, the polymerization vessel further comprises at least one intercepting tube. The at least one intercepting tube is disposed in the vessel body, and each of the at least one intercepting tube extends along an axis of the vessel body. Each of the at least one intercepting tube comprises an outer tube, an inner tube and a plurality of rib plates. The inner tube is sleeved in the outer tube. The rib plates are disposed between the outer tube and the inner tube.

According to some embodiments of the present application, the outer tube is a nickel tube, and the inner tube is a stainless steel tube.

According to another aspect of the present application, a method for manufacturing a polymerization vessel is provided. In the method for manufacturing a polymerization vessel, an excavation process is firstly performed to an interior surface of a vessel body of the polymerization vessel to form at least one spiral flow channel. Each of the at least one spiral flow channel includes a plurality of grooves and a plurality of partition walls, and each one of the grooves is located between adjacent two of the partition walls. Then, a shell plate is respectively covered on each of the grooves so as to subject each of the at least one spiral flow channel to be closed. The shell plate is jointed to the adjacent two of the partition walls.

According to some embodiments of the present application, the shell plate merely covers one of the grooves along a direction perpendicular to an axis of the vessel body.

According to some embodiments of the present application, the shell plate covers the adjacent two of the partition walls, and there is no a gap between the shell plate and adjacent shell plate.

According to some embodiments of the present application, an inner surface of the shell plate is coplanar to inner surfaces of the adjacent two of the partition walls.

According to some embodiments of the present application, after the operation of covering the shell plate on the grooves, the method further comprises forming a metallic covering layer on a surface of each of the at least one spiral flow channel.

According to some embodiments of the present application, the metallic covering layer is formed from a material with lower fouling factor than materials of the vessel body and the shell plate.

According to some embodiments of the present application, after the operation of covering the shell plate on the grooves, the method further comprises performing an electroplating process to each of the at least one spiral flow channel so as to subject a surface of each of the at least one spiral flow channel to be equipped with a nickel layer.

According to some embodiments of the present application, the method further comprises disposing at least one intercepting tube in the vessel body. The at least one intercepting tube extends along a direction parallel to an axis of the vessel body. Each of the at least one intercepting tube comprises an outer tube, an inner tube and a plurality of rib plates. The inner tube is sleeved in the outer tube. The rib plates are disposed between the outer tube and the inner tube. The outer tube, the inner tube and the rib plates are jointed together without a welding process.

According to yet another aspect of the present application, a method for manufacturing a polymerization vessel is provided. In the method for manufacturing a polymerization vessel, an excavation process is firstly performed to an interior surface of a vessel body of the polymerization vessel to form at least one spiral flow channel. Each of the at least one spiral flow channel includes a plurality of grooves and a plurality of partition walls, and each one of the grooves is located between adjacent two of the partition walls. Then, a shell plate is respectively covered on each of the grooves so as to subject each of the at least one spiral flow channel to be closed. The shell plate is jointed to the adjacent two of the partition walls to form a uniform inner surface of the polymerization vessel. After the shell plate is covered, an electroplating process is performed to each of the at least one spiral flow channel so as to subject a surface of each of the at least one spiral flow channel to be equipped with a nickel layer According to some embodiments of the present application, the method further comprises disposing at least one intercepting tube in the vessel body. The at least one intercepting tube extends along a direction parallel to an axis of the vessel body. Each of the at least one intercepting tube comprises an outer tube, an inner tube and a plurality of rib plates. The inner tube is sleeved in the outer tube. The rib plates are disposed between the outer tube and the inner tube. The outer tube, the inner tube and the rib plates are jointed together without a welding process.

According to some embodiments of the present application, the outer tube is a nickel tube, the inner tube is a stainless steel tube, and the rib plates are stainless steel plates.

In the polymerization vessel and the method for manufacturing the same of the present application, the vessel body of the polymerization vessel is subjected to the excavation process and covered with the shell plates to form the closed cooling channel on the interior surface of the vessel body. The structure of the cooling channel can efficiently prevent the conventional by-pass defects, such that the heat removal efficacy of the polymerization vessel is improved. Moreover, the nickel layer is disposed on the surface of the cooling channel to inhibit the fouling, lower the fouling factor and further maintain the heat transfer coefficient of the cooling channel for a long-term. Accordingly, the heat removal efficacy of the polymerization vessel is further enhanced, and service life thereof is prolonged. Furthermore, the polymerization vessel of the present application can be equipped with the intercepting tubes having a structure of double tube to enhance the heat removal efficacy of the polymerization vessel. In addition to enhance the heat removal efficacy of the polymerization vessel, the specific structure of the cooling channel and the double tube structure of the intercepting tubes of the present application facilitate to enhance the compressive strength of the polymerization vessel. Therefore, the present application can meet the requirements for reaction heat management and high pressure resistance of a large-scale polymerization vessel.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
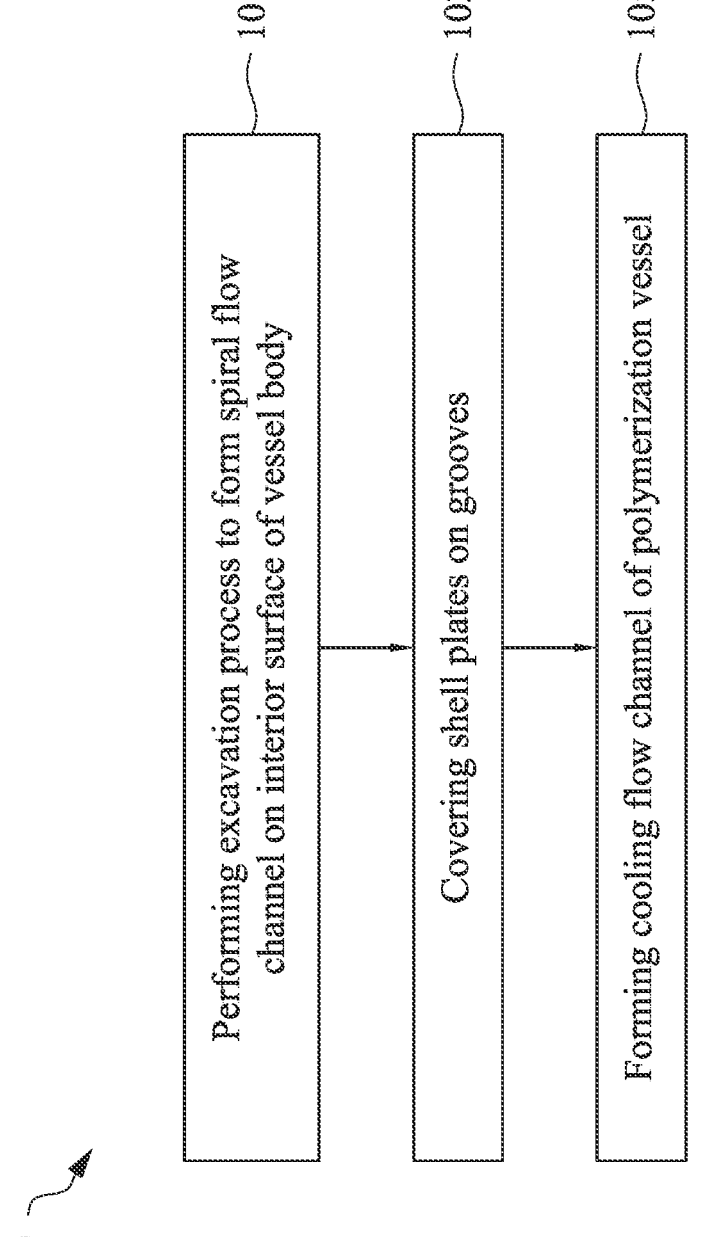
FIG. 1 illustrates a flow chart of a method for manufacturing a polymerization vessel according to some embodiments of the present application.

Reference will now be made in detail to the present embodiments of the invention, examples of which are illustrated in the accompanying drawings. Wherever possible, the same reference numbers are used in the drawings and the description to refer to the same or like parts.

Unless otherwise indicated herein, the term "inner surface" described below of the present application refers to a surface of a member which is close to an axis of the polymerization vessel. In other words, the inner surface refers to a side facing a containing space of the polymerization vessel. Accordingly, an outer surface relative to the inner surface refers to a surface closing to an outer of the polymerization vessel.

Figure 2:
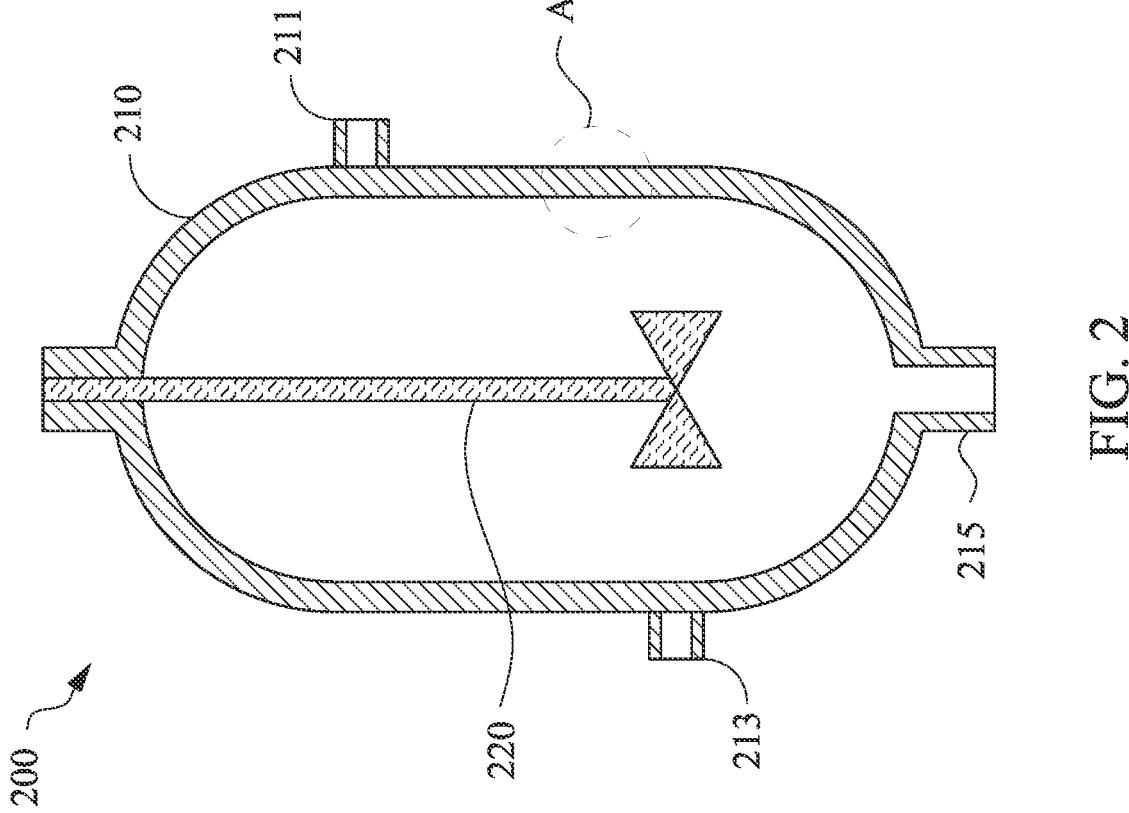
FIG. 2 illustrates a schematic cross-sectional view of the polymerization vessel taken along an axis of the polymerization vessel according to some embodiments of the present application.

Referring to FIG. 1 together with FIG. 2. FIG. 1 illustrates a flow chart of a method for manufacturing a polymerization vessel according to some embodiments of the present application, and FIG. 2 illustrates a schematic cross-sectional view of the polymerization vessel taken along an axis of the polymerization vessel according to some embodiments of the present application. The method 100 is used to form a cooling channel with a specific structure in a polymerization vessel 200 to efficiently improve the heat removal efficacy of the polymerization vessel 200, thereby meeting the requirements of the application.

The polymerization vessel 200 includes a vessel body 210, an inlet 213 for a cooling fluid, an outlet 211 for the cooling fluid, a discharging port 215 and a mixing unit 220. The arrangements of the inlet 213 and the outlet 211 for the cooling fluid are well known to one skilled in the art rather than focusing or mentioning them in details. However, it should be noted that although numbers of the inlet 213 and the outlet 211 for the cooling fluid illustrated in FIG. 2 are respectively merely one, the present application is not limited to the configuration. The numbers of the inlet 213 and the outlet 211 for the cooling fluid may be more than one depending on a desired cooling efficiency of the polymerization vessel 200. In the embodiments, the number of inlets 213 for the cooling fluid may be different from the number of outlets 211. The inlet 213 and the outlet 211 for the cooling fluid are communicated with a cooling channel of the polymerization vessel described below, thereby introducing the cooling fluid into the cooling channel. Similarly, the arrangements of a feeding port (not shown), the discharging port 215 and the mixing unit 220 are also well known to one skilled in the art rather than focusing or mentioning them in details.

Figure 3A:
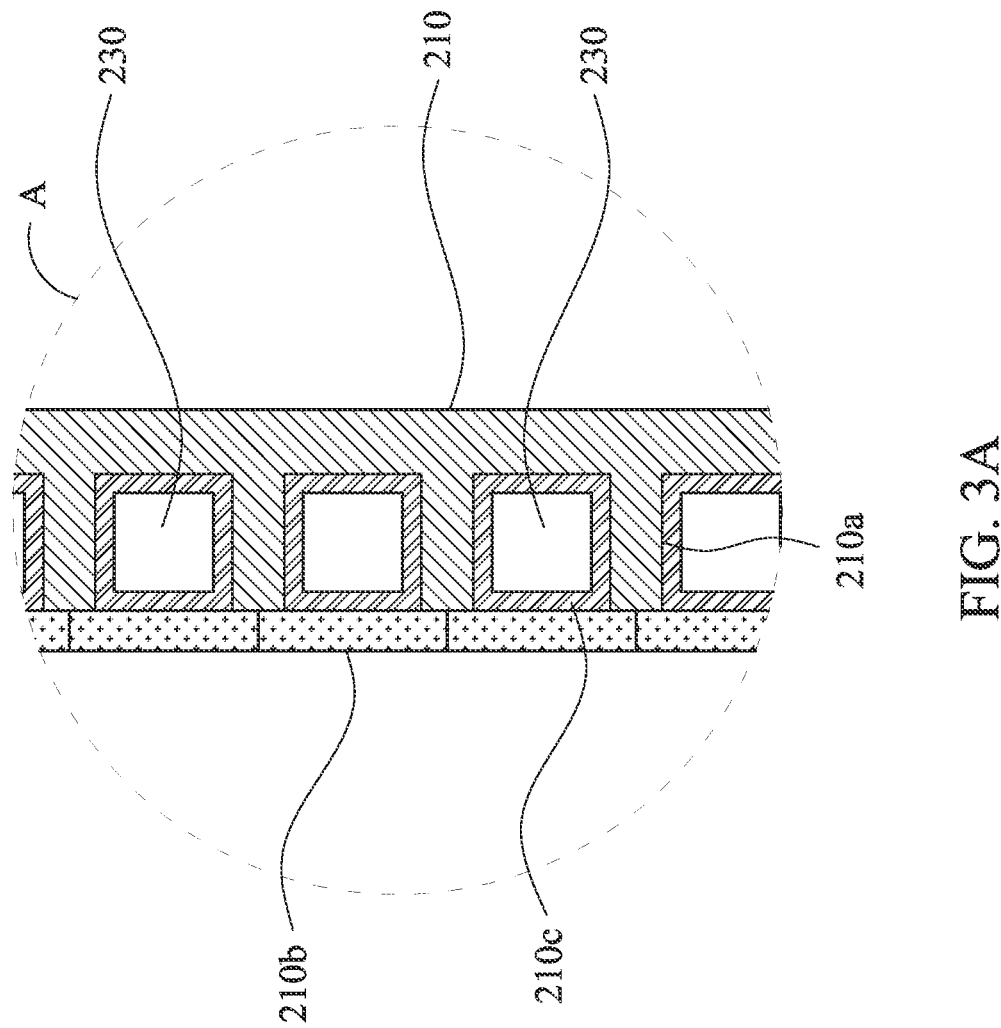
FIG. 3A and FIG. 3B respectively illustrates enlarged views of area A of FIG. 2 according to some embodiments of the present application.

Referring to FIG. 1 together with FIG. 2 and FIG. 3A. FIG. 3A illustrates an enlarged view of an area A of FIG. 2 according to some embodiments of the present application. In the method 100, an excavation process is firstly performed to the vessel body 210 of the polymerization vessel 200 (FIG. 2) to form a spiral flow channel on an interior surface of the vessel body 210, shown as operation 101. It can be realized that the flow channel formed by the excavation process spirally extends along the axis of the vessel body 210 because the vessel body 210 is a cylindrical reaction tank. The spiral flow channel is composed of the vessel body 210 and a partition wall 210a. Because the spiral flow channel is formed by performing the excavation process to the vessel body 210, the spiral flow channel is composed of a plurality of grooves and a plurality of partition walls 210a, and each partition wall 210a disposed between two adjacent grooves is protruded from the interior surface of the vessel body 210. Accordingly, the partition wall 210a and the vessel body 210 are integrally formed, such that it can ensure that the cooling fluid introduced later will not leak from the joint position of the partition wall 210a and the vessel body 210, and further the conventional by-pass defects of the cooling fluid can be prevented. Therefore, the heat removal efficacy of the polymerization vessel 200 can be efficiently improved.

In some embodiments, there are no specific limitations to the excavation process performed to the vessel body 210, and suitable excavation processes can be adopted to form the spiral flow channel depending on materials of the vessel body 210. For example, mechanical cutting methods and equipment can be used to form the spiral flow channel. In other examples, the spiral flow channel can also be formed by direct mold casting method to further enhance the jointing strength between the partition wall 210a and the vessel body 210. There are no specific limitations to the structure of the spiral flow channel, and the dimensions and configurations of the spiral flow channel can be designed according to the heat removal efficacy and the requirements of pressure resistance of the polymerization vessel 200. In some examples, an excavation depth (i.e. excavating along a direction perpendicular to the axis) of the excavation process may be 10 mm to 50 mm, an excavation width (i.e. excavating along a direction parallel to the axis) may be 50 mm to 150 mm, and a width of the partition wall 210a may be 8 mm to 20 mm.

In some embodiments, one or more spiral flow channels can be formed on the interior surface of the vessel body 210 by the excavation process. When the number of the spiral flow channel is one, the spiral flow channel extends continuously and spirally on the interior surface of the vessel body 210. When the number of the spiral flow channels is multiple, each of the flow channels extends independently and spirally along the axis of the vessel body 210. It can be realized that the aforementioned inlet 213 and the outlet 211 for the cooling fluid can be disposed according to the number of the spiral flow channel. In FIG. 3A, although each of the grooves separated by the partition wall 210a is independent for the purpose of illustration, in a case that one spiral flow channel is formed by the excavation process, the grooves illustrated in FIG. 3A are substantially communicated with adjacent grooves because the spiral flow channel spirally extends along the axis of the vessel body 210. In a case of forming a plurality of spiral flow channels, these grooves are communicated with adjacent grooves which is belonging to a same spiral flow channel. The following description is merely illustrated with only one spiral flow channel formed by the excavation process for the convenience of description.

Referring to FIG. 1 with FIG. 3A. After the operation 101 is performed, a shell plate 210b is covered on the groove of the spiral flow channel to form a closed cooling flow channel 230 on the interior surface of the vessel body 210, shown as operation 103 and operation 105. A material of the shell plate 210b may be the same as that of the vessel body 210, thereby facilitating the jointing of those. For example, the material of the vessel body 210 and the shell plate 210b can be stainless steel, other suitable materials or a combination thereof. The shell plate 210b is disposed on the two partition walls 210a so as to form a closed cooling channel 230 with the groove between the two partition walls 210a. In some embodiments, because the grooves are communicated with each other, the configuration of the shell plate 210b extends along the spiral flow channel and a number of the shell plate 210b is one. In other embodiments, the number of the shell plates 210b can be multiple, and those shell plates 210b are connected in series (i.e. connected in a manner of head to tail along the spiral extending direction). However, it should be noted that the cooling fluid flowing in the cooling channel does not leak from the jointing location of the shell plates 210b, in these embodiments. There are no specific limitations to thicknesses of the shell plate 210b as long as the closed cooling channel can be formed and meet the heat removal efficacy and the requirements of pressure resistance of the vessel body 210. In some examples, the thickness of the shell plate 210b can be 4 mm to 16 mm. In some embodiments, the covering of the shell plate 210b can be achieved by welding, locking, other suitable methods that do not result in leakage of the cooling fluid, or a combination thereof.

Figure 3B:
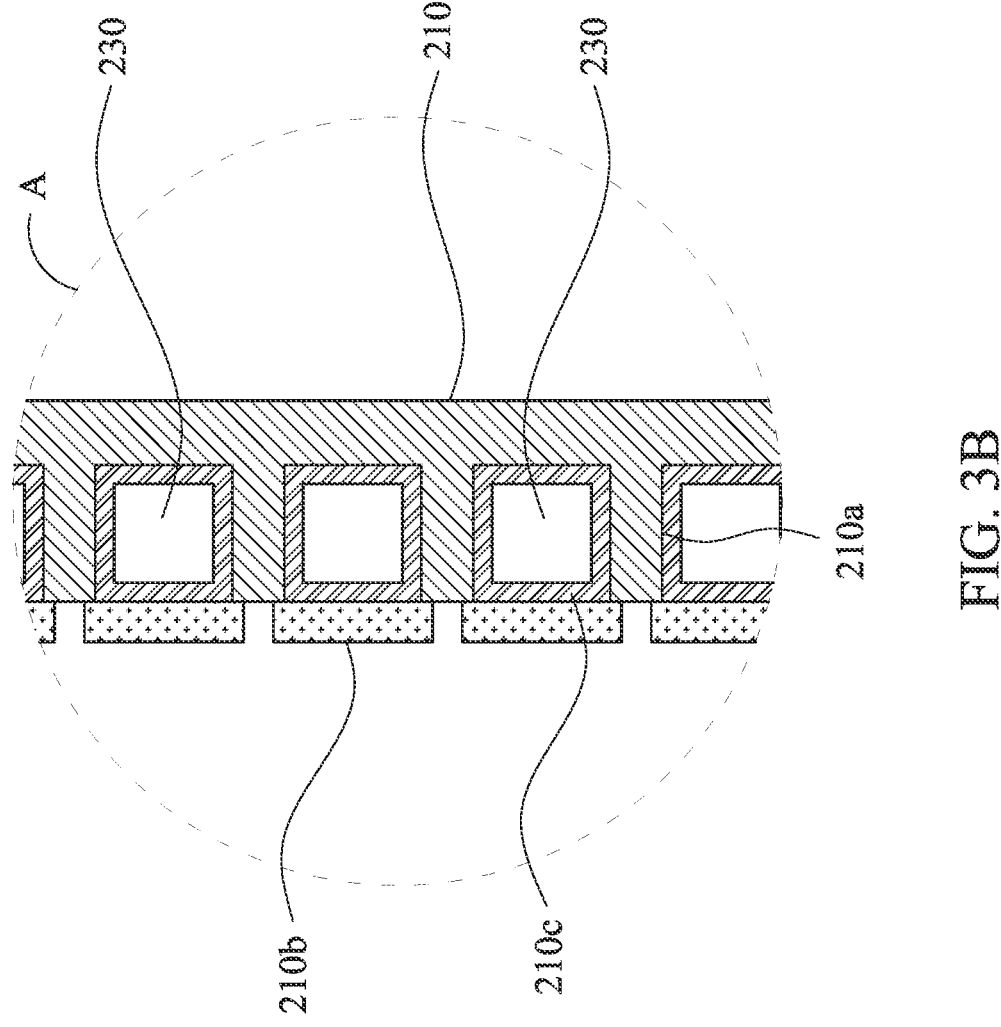

Although there is no gap between the two shell plates 210b covering the adjacent grooves illustrated in FIG. 3A, the present application is not intended to be limited to this. In other embodiments, based on the requirements that the closed cooling channel is formed by the covering of the shell plates 210b, there is a gap between the two shell plates 210b (shown as FIG. 3B). In other embodiments, the inner surface of the shell plate 210b and the inner surface of the partition wall 210a may be coplanar, such that the inner surface of the vessel body 210 is uniform, and further a flow field in the vessel body 210 is optimized.

In order to efficiently solve the conventional by-pass defects, the two adjacent shell plates 210b do not overlap each other in a direction perpendicular to the axis of the vessel body 210, and therefore each of the grooves shown in FIG. 3A forms a closed cross-section.

Continuously Referring to FIG. 1 and FIG. 3A. In some embodiments, after the aforementioned operations 103 and 105 are performed, an electroplating process is selectively performed to the closed cooling channel 230 which have been covered with the shell plate 210b to form a nickel layer 210c with uniform thickness on the surface of the closed cooling channel 230. When the surface of the cooling channel 230 is equipped with the nickel layer 210c, it facilitates to ensure the heat transfer efficiency of the cooling channel 230, and further the nickel layer 210c has lower fouling factor ($f_o$) than the stainless steel materials of the conventional vessel body 210 and shell plates 210b ($f_o$ of nickel metal is about 0.0001 $m^2$ h.° C./kcal, and $f_o$ of stainless steel material is about 0.0004 $m^2$ h.° C./kcal). Therefore, the nickel layer 210c facilitates to prevent the surface of the cooling channel 230 from fouling to maintain the heat transfer coefficient of the cooling channel 230 for a long-term. Accordingly, the conventional lowering of the heat removal efficacy induced by the fouling can be efficiently prevented, and the maintenance frequency of the polymerization vessel can be prolonged. There are no specific limitations to the thickness of the nickel layer 210c, but the thickness of the nickel layer 210c can be not less than 0.01 mm for better heat removal efficacy, in some examples. In other examples, the thickness of the nickel layer 210c can be 0.01 mm to 0.04 mm to give consideration to both of the better heat removal efficacy and cost requirements. In some examples, the nickel layer 210c is formed from nickel metal, nickel alloy, nickel compound or a combination thereof. Preferably, the nickel layer 210c is formed from the nickel metal.

Figure 4:
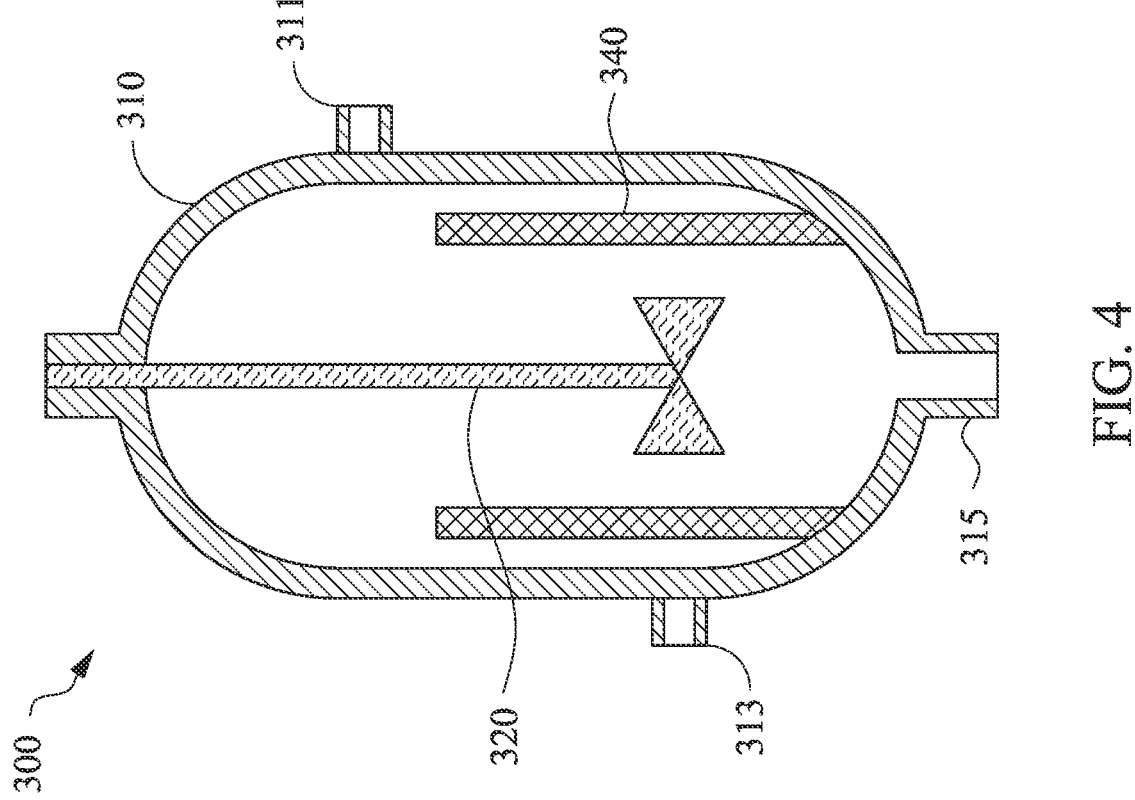
FIG. 4 illustrates a schematic cross-sectional view of the polymerization vessel taken along an axis of the polymerization vessel according to some embodiments of the present application.
Figure 5:
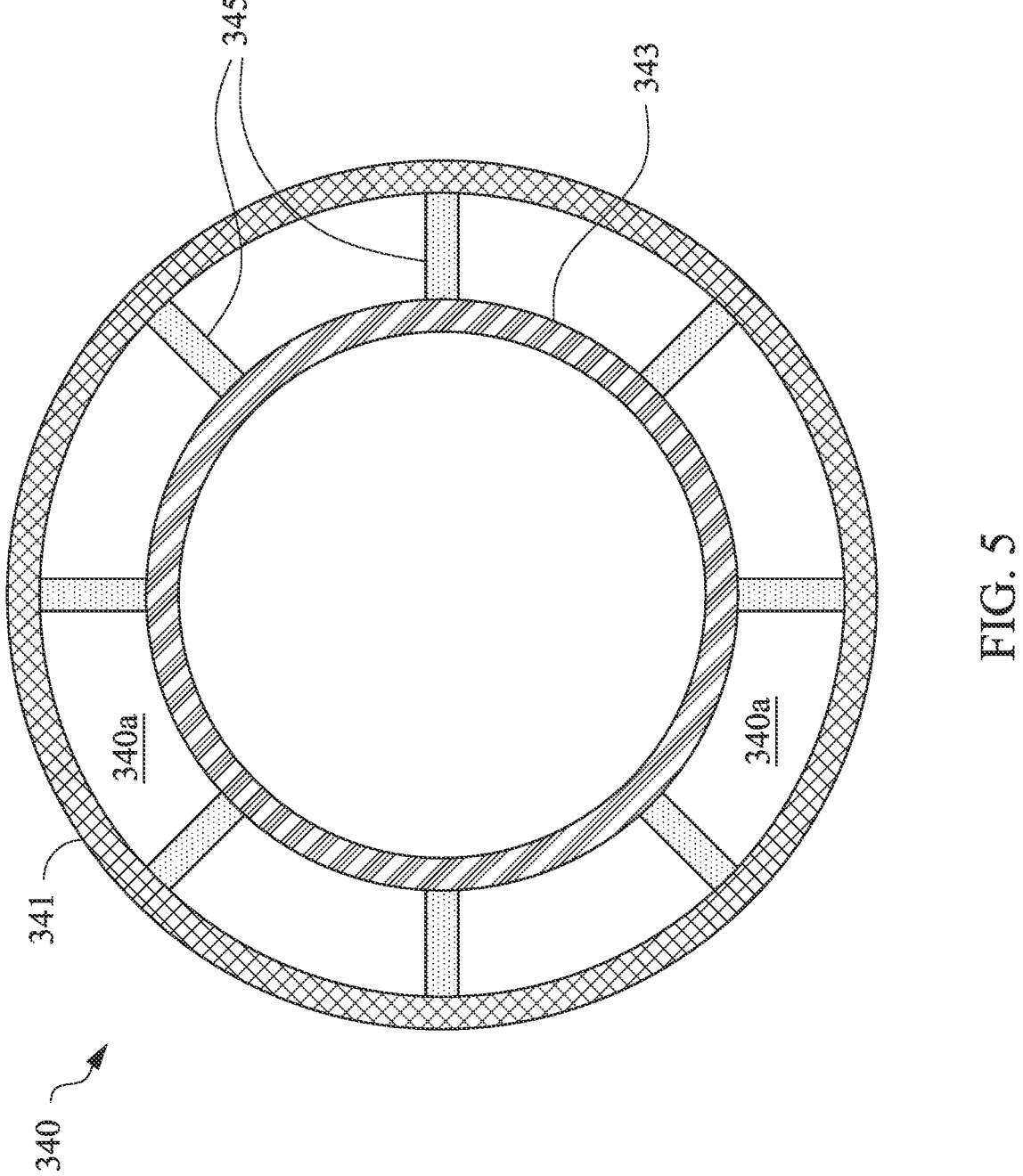
FIG. 5 illustrates a schematic cross-sectional view of intercepting tubes taken along a direction perpendicular to an axis of the polymerization vessel according to some embodiments of the present application.

Referring to FIG. 4 together with FIG. 5. FIG. 4 illustrates a schematic cross-sectional view of the polymerization vessel taken along an axis of the polymerization vessel according to some embodiments of the present application, and FIG. 5 illustrates a schematic cross-sectional view of intercepting tubes taken along a direction perpendicular to an axis of the polymerization vessel according to some embodiments of the present application. A polymerization vessel 300 in FIG. 4 is substantially similar to the polymerization vessel 200 in FIG. 2 in structure, but the difference therebetween resides in that the polymerization vessel 300 comprises intercepting tubes 340. The arrangement positions of the intercepting tubes 340 are well known to one skilled in the art rather than focusing or mentioning them in details. Each of the intercepting tubes 340 includes an outer tube 341, an inner tube 343 and a plurality of rib plates 345. The inner tube 343 is sleeved in the outer tube 341, and the rib plates 345 are disposed between the outer tube 341 and the inner tube 343, such that a plurality of intercepting channels 340a are formed between the outer tube 341 and the inner tube 343. Based on the design of the intercepting channels 340a between the double tubes, a flow rate of a fluid can be efficiently enhanced, and the polymerization vessel 300 has better heat removal efficacy. In some examples, the flow rate of the fluid flowing through the intercepting channel 340a is about 1 M/s to 5 M/s.

The intercepting tube 340 can be fabricated by cold shrinking assembly, heat shrinking assembly, other suitable methods or a combination thereof. In some embodiments, the joint of the outer tube 341 and the rib 345 of the intercepting tube 340 of the present application excludes a welding process, and therefore the deformation and cracking of the intercepting tube 340 induced by the heat energy applied by welding can be prevented. Although the number of the intercepting tubes 340 illustrated in FIG. 4 is two, the present application is not intended to be limited to this. In other embodiments, the number of the intercepting tubes 340 can be adjusted based on the designed requirements of the polymerization vessel 300.

In some embodiments, the outer tube 341 can be formed from nickel metal and/or nickel alloy, and the inner tube 343 and the rib plates 345 can be formed from stainless steel. The outer tube 341 formed from nickel metal and/or nickel alloy can further improve the heat removal efficacy of the intercepting tubes 340, and can it facilitates to prevent the fouling defect induced by the reaction heat; and the inner tube 343 and the rib plates 345 can be as a supporting for the outer tube 341, and thereby the compressive strength of the intercepting tube 340 is efficiently improved.

In some application examples, the heat transfer coefficient of the polymerization vessel including the aforementioned cooling channel and intercepting tubes of the present application can be enhanced to 1200 kcal/$m^2$ hr° C., thereby facilitating to remove the reaction heat, and the cooling channel and the intercepting tubes have excellent compressive strength. Therefore, the polymerization vessel of the present application can meet the designed requirements of high pressure resistance for a large-scale polymerization vessel. The cooling channel can efficiently solve the by-pass defects of the cooling fluid in the conventional cooling channel, and therefore it facilitates to improve the heat removal efficacy of the polymerization vessel. Besides, based on the materials adopted in the nickel layer and the intercepting tubes, the general fouling defects are efficiently controlled, thereby contributing to prolong service life and the heat removal efficacy of the polymerization vessel, further meeting the requirements of the large-scale polymerization vessel and efficiently lowering cost of the unit Accordingly, the spiral flow channel with specific structures of the present application is integrally formed on the interior surface of the vessel body, and the shell plates are further covered thereon to form the closed cooling channel, further efficiently solving the conventional by-pass defects. Moreover, the nickel layer is formed on the surface of the cooling channel, such that the surface of the cooling channel is hard to be fouled, thereby preventing the lowering of the cooling efficiency induced by the fouling, and further the heat removal efficacy of the cooling channel is enhanced. Besides, the intercepting tubes are disposed in the polymerization vessel of the present application to enhance the heat removal efficacy thereof. The intercepting tube is designed as a double tube including a nickel tube and a stainless steel tube, thereby efficiently inhibiting fouling and increasing flowing rate, and further the heat removal efficacy and the compressive strength of the polymerization vessel are improved.

As is understood by a person skilled in the art, the foregoing preferred embodiments of the present application are illustrated of the present application rather than limiting of the present application. In view of the foregoing, it is intended to cover various modifications and similar arrangements included within the spirit and scope of the appended claims. Therefore, the scope of which should be accorded the broadest interpretation so as to encompass all such modifications and similar structure.

What is claimed is:

1. A polymerization vessel, comprising:

a vessel body, including a vessel wall and a plurality of partition walls, and each of the partition walls protrudes from an interior surface of the vessel wall, wherein the partition walls and the vessel wall are integrally formed;

at least one shell plate, jointing each adjacent two of the partition walls, wherein at least one flow channel is defined by each adjacent two of the partition walls, the vessel wall and the at least one shell plate;

at least one fluid inlet, passing through the vessel wall, wherein the at least one fluid inlet communicates with the at least one flow channel in one-to-one manner; and at least one fluid outlet, passing through the vessel wall, wherein the at least one fluid outlet communicates with the at least one flow channel in one-to-one manner.

2. The polymerization vessel of claim 1, further comprising:

a metallic covering layer, disposed on a surface of the at least one flow channel, wherein the metallic covering layer is formed from a material with a lower fouling factor than materials of the vessel body and the at least one shell plate.

3. The polymerization vessel of claim 2, wherein the metallic covering layer includes a nickel layer.

4. The polymerization vessel of claim 3, wherein a thickness of the nickel layer is not less than 0.01 mm.

5. The polymerization vessel of claim 1, wherein the at least one shell plate covers each adjacent two of the partition walls, and each adjacent two of the at least one shell plate do not overlap in a direction perpendicular to an axis of the vessel body.

6. The polymerization vessel of claim 5, wherein there is no a gap between each adjacent two of the at least one shell plate.

7. The polymerization vessel of claim 1, wherein an inner surface of the at least one shell plate is coplanar to an inner surface of each of the partition walls.

8. The polymerization vessel of claim 1, further comprising:

at least one intercepting tube, disposed in the vessel body, and each of the at least one intercepting tube extends along an axis of the vessel body, wherein each of the at least one intercepting tube comprises:

an outer tube;

an inner tube, sleeved in the outer tube; and a plurality of rib plates, disposed between the outer tube and the inner tube.

9. The polymerization vessel of claim 8, wherein the outer tube is a nickel tube, and the inner tube is a stainless steel tube.

10. A method for manufacturing a polymerization vessel, comprising:

performing an excavation process to an interior surface of a vessel body of the polymerization vessel to form at least one spiral flow channel, wherein each of the at least one spiral flow channel includes a plurality of grooves and a plurality of partition walls, and each one of the grooves is located between adjacent two of the partition walls; and respectively covering a shell plate on each of the grooves so as to subject each of the at least one spiral flow channel to be closed, wherein the shell plate is jointed to the adjacent two of the partition walls.

11. The method for manufacturing the polymerization vessel of claim 10, wherein the shell plate merely covers one of the grooves along a direction perpendicular to an axis of the vessel body.

12. The method for manufacturing the polymerization vessel of claim 10, wherein the shell plate covers the adjacent two of the partition walls, and there is no a gap between the shell plate and adjacent shell plate.

13. The method for manufacturing the polymerization vessel of claim 10, wherein an inner surface of the shell plate is coplanar to inner surfaces of the adjacent two of the partition walls.

14. The method for manufacturing the polymerization vessel of claim 10, after the operation of covering the shell plate on the grooves, the method further comprises:

forming a metallic covering layer on a surface of each of the at least one spiral flow channel.

15. The method for manufacturing the polymerization vessel of claim 14, wherein the metallic covering layer is formed from a material with lower fouling factor than materials of the vessel body and the shell plate.

16. The method for manufacturing the polymerization vessel of claim 10, after the operation of covering the shell plate on the grooves, the method further comprises:

performing an electroplating process to each of the at least one spiral flow channel so as to subject a surface of each of the at least one spiral flow channel to be equipped with a nickel layer.

17. The method for manufacturing the polymerization vessel of claim 10, further comprising:

disposing at least one intercepting tube in the vessel body, wherein the at least one intercepting tube extends along a direction parallel to an axis of the vessel body, and each of the at least one intercepting tube comprises:

an outer tube;

an inner tube, sleeved in the outer tube; and a plurality of rib plates, disposed between the outer tube and the inner tube, and wherein the outer tube, the inner tube and the rib plates are jointed together without a welding process.

18. A method for manufacturing a polymerization vessel, comprising:

performing an excavation process to an interior surface of a vessel body of the polymerization vessel to form at least one spiral flow channel, wherein each of the at least one spiral flow channel includes a plurality of grooves and a plurality of partition walls, and each one of the grooves is located between adjacent two of the partition walls;

respectively covering a shell plate on each of the grooves so as to subject each of the at least one spiral flow channel to be closed, wherein the shell plate is jointed to the adjacent two of the partition walls to form an uniform inner surface of the polymerization vessel; and after covering the shell plate, performing an electroplating process to each of the at least one spiral flow channel so as to subject a surface of each of the at least one spiral flow channel to be equipped with a nickel layer.

19. The method for manufacturing the polymerization vessel of claim 18, further comprising:

disposing at least one intercepting tube in the vessel body, wherein the at least one intercepting tube extends along a direction parallel to an axis of the vessel body, and each of the at least one intercepting tube comprises:

an outer tube;

an inner tube, sleeved in the outer tube; and a plurality of rib plates, disposed between the outer tube and the inner tube, and wherein the outer tube, the inner tube and the rib plates are jointed together without a welding process.

20. The method for manufacturing the polymerization vessel of claim 19, wherein the outer tube is a nickel tube, the inner tube is a stainless steel tube, and the rib plates are stainless steel plates.

\* \* \* \* \*